United States Patent
Bendak et al.

(10) Patent No.: US 7,158,535 B1
(45) Date of Patent: Jan. 2, 2007

(54) SYSTEM AND METHOD FOR TRANSLATING OVERHEAD BYTES IN A MULTIDIMENSIONAL DIGITAL FRAME STRUCTURE

(75) Inventors: George Beshara Bendak, San Diego, CA (US); Alan Michael Sorgi, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 925 days.

(21) Appl. No.: 09/746,159

(22) Filed: Dec. 22, 2000

(51) Int. Cl.
*H04J 3/06* (2006.01)
*H04L 12/56* (2006.01)

(52) U.S. Cl. .................. 370/467; 370/474; 370/510; 370/538

(58) Field of Classification Search ............. 370/389, 370/395.5, 401, 466, 467, 529; 714/752–785
See application file for complete search history.

(56) References Cited

U.S. PATENT DOCUMENTS

| | | |
|---|---|---|
| 5,251,205 A | 10/1993 | Callon et al. |
| 5,490,252 A | 2/1996 | Macera et al. |
| 5,568,471 A | 10/1996 | Hershey et al. |
| 5,651,002 A * | 7/1997 | Van Seters et al. ......... 370/392 |
| 5,661,763 A | 8/1997 | Sands |
| 5,666,108 A | 9/1997 | Duffy |
| 5,778,000 A | 7/1998 | Dosiere et al. |
| 5,793,976 A | 8/1998 | Chen et al. |
| 5,835,730 A * | 11/1998 | Grossman et al. .......... 709/247 |
| 5,854,699 A | 12/1998 | Olshansky |
| 5,875,396 A | 2/1999 | Stockton et al. |
| 5,982,743 A | 11/1999 | Kusano |
| 6,006,069 A | 12/1999 | Langston |
| 6,084,888 A * | 7/2000 | Watanabe et al. ........... 370/473 |
| 6,141,788 A * | 10/2000 | Rosenberg et al. ......... 714/774 |
| 6,557,031 B1 * | 4/2003 | Mimura et al. ............. 709/218 |
| 6,765,865 B1 * | 7/2004 | Rayner et al. ............... 370/228 |

* cited by examiner

*Primary Examiner*—Chau Nguyen
*Assistant Examiner*—Soon D. Hyun
(74) *Attorney, Agent, or Firm*—Incaplaw; Terrance A. Meador

(57) ABSTRACT

A system and method have been provided for translating digitally wrapped communications between networks using different protocols. This invention makes use of an integrated circuit (IC) relay with programmable features to modify the locations and functions of overhead bytes between the receive and transmit sides of the device, permitting two dissimilar networks to be bridged. That is, the IC relay converts frame formatting from one frame structure to another, so that incompatible networks can communicate.

23 Claims, 5 Drawing Sheets

SYSTEM AND METHOD FOR TRANSLATING OVERHEAD BYTES IN A MULTIDIMENSIONAL DIGITAL FRAME STRUCTURE

This application contains material related to the following commonly assigned U.S. Patent Applications, which were concurrently filed with this application, and are hereby incorporated by reference:

Ser. No. 09/746,490, filed 22 Dec. 2000 now U.S. Pat. No. 6,973,100 for "SYSTEM AND METHOD FOR PROGRAMMING THE LOCATION OF FRAME SYNCHRONIZATION WORDS IN A MULTIDIMENSIONAL DIGITAL FRAME STRUCTURE"

Ser. No. 09/745,655, filed 22 Dec. 2000 now U.S. Pat. No. 6,973,099 for "SYSTEM AND METHOD FOR PROGRAMMING THE VALUE OF FRAME SYNCHRONIZATION WORDS IN A MULTIDIMENSIONAL DIGITAL FRAME STRUCTURE"

Ser. No. 09/747,380, filed 22 Dec. 2000 now U.S. Pat. No. 6,965,618 for "SYSTEM AND METHOD FOR PROGRAMMING THE BIT ERROR RATE OF FRAME SYNCHRONIZATION WORDS IN A MULTIDIMENSIONAL DIGITAL FRAME STRUCTURE"

Ser. No. 09/746,152, filed 22 Dec. 2000 for "SYSTEM AND METHOD FOR PROGRAMMING THE QUANTITY OF FRAME SYNCHRONIZATION WORDS IN A MULTIDIMENSIONAL DIGITAL FRAME STRUCTURE"

Ser. No. 09/745,793, filed 22 Dec. 2000 now U.S. Pat. No. 6,931,006 for "SYSTEM AND METHOD FOR SELECTIVELY BROADCASTING A MULTIDIMENSIONAL DIGITAL FRAME STRUCTURE"

Ser. No. 09/745,774, filed 22 Dec. 2000 now U.S. Pat. No. 6,847,657 for "SYSTEM AND METHOD FOR PROGRAMMING SYNCHRONIZATION CRITERIA IN A MULTIDIMENSIONAL DIGITAL FRAME STRUCTURE"

Ser. No. 09/747,072, filed 22 Dec. 2000 now U.S. Pat. No. 6,876,485 for "SYSTEM AND METHOD FOR PROGRAMMING LOSS OF SYNCHRONIZATION IN A MULTIDIMENSIONAL DIGITAL FRAME STRUCTURE"

Ser. No. 09/527,343, filed 17 Mar. 2000 for "TRANSPOSABLE FRAME SYNCHRONIZATION STRUCTURE"

Ser. No. 09/528,021, filed 17 Mar. 2000 now U.S. Pat. No. 6,795,451 for "PROGRAMMABLE SYNCHRONIZATION STRUCTURE WITH AUXILIARY DATA LINK"

BACKGROUND OF THE INVENTION

1. Field of the Invention

This invention relates generally to digitally wrapped communications and, more particularly, to a system and method of translating the organization of overhead bytes between networks using different protocols of organization.

2. Description of the Related Art

Digitally wrapped, or multidimensional frame structure communications generally describe information that is sent as a packet without overhead to control the communication process. The packet can also include forward error correction (FEC) to recover the payload in the communication is degraded. One such example of such a communication is the synchronous optical network (SONET).

There are many framed communication protocols in use, depending on the service provider and the equipment being used. These differences in protocols can be arbitrary or supported by an underlying function. There is no convenient way of interfacing two networks using different protocols. There are standard practices to join two networks that are using different framing formats. Frame synchronization and overhead placement are sometimes standardized by governing organizations such as the ITU-T, but before or during the creation of these standards networks are installed that are/will be incompatible with each other and the evolving standards.

Conventionally, the interface node must include two sets of equipment. A communication in the first protocol is received at the first set of equipment. The message is unwrapped and the payload recovered. Synchronization protocols must be established between the equipment set and a second set of equipment. The payload can then be received at the second equipment set and repackaged for transmission in a different protocol.

It would be advantageous if a method existed for bridging between two networks that use different framing protocols.

It would be advantageous if a standard bridging operation between networks could be performed without having to unwrap the payload in the first format, and without having to rewrap the payload in a second format.

SUMMARY OF THE INVENTION

The purpose of this invention is to provide a programmable framing and overhead structure for a FEC encoded channel that can be used to bridge two dissimilar digital wrapper networks. This invention is an integrated circuit (IC) relay that makes use of programmable features to modify the locations and functions of overhead bytes between the receive and transmit sides of the device, permitting two dissimilar networks to be bridged. That is, the IC relay converts frame formatting from one frame structure to another, so that incompatible networks can communicate.

A method for translating multidimensional digital frame structures is also provided. The method comprises: receiving a frame with overhead bytes organized in a first system; and, translating the frame so that the overhead bytes are organized in a second system. For example, an overhead byte is received in a first location and relocated to a second location. Alternately, an overhead byte having a first value is received, and replaced with an overhead byte having a second value. The overhead bytes are selected from the group including frame synchronization bytes, data communication channel (DCC) bytes, bit interleaved parity (BIP) bytes, Trace bytes, and multiframe alignment signal bytes. Further details of the above-described method and relay IC are provided below.

DETAILED DESCRIPTION OF THE PREFERRED EMBODIMENTS

Figure 1:
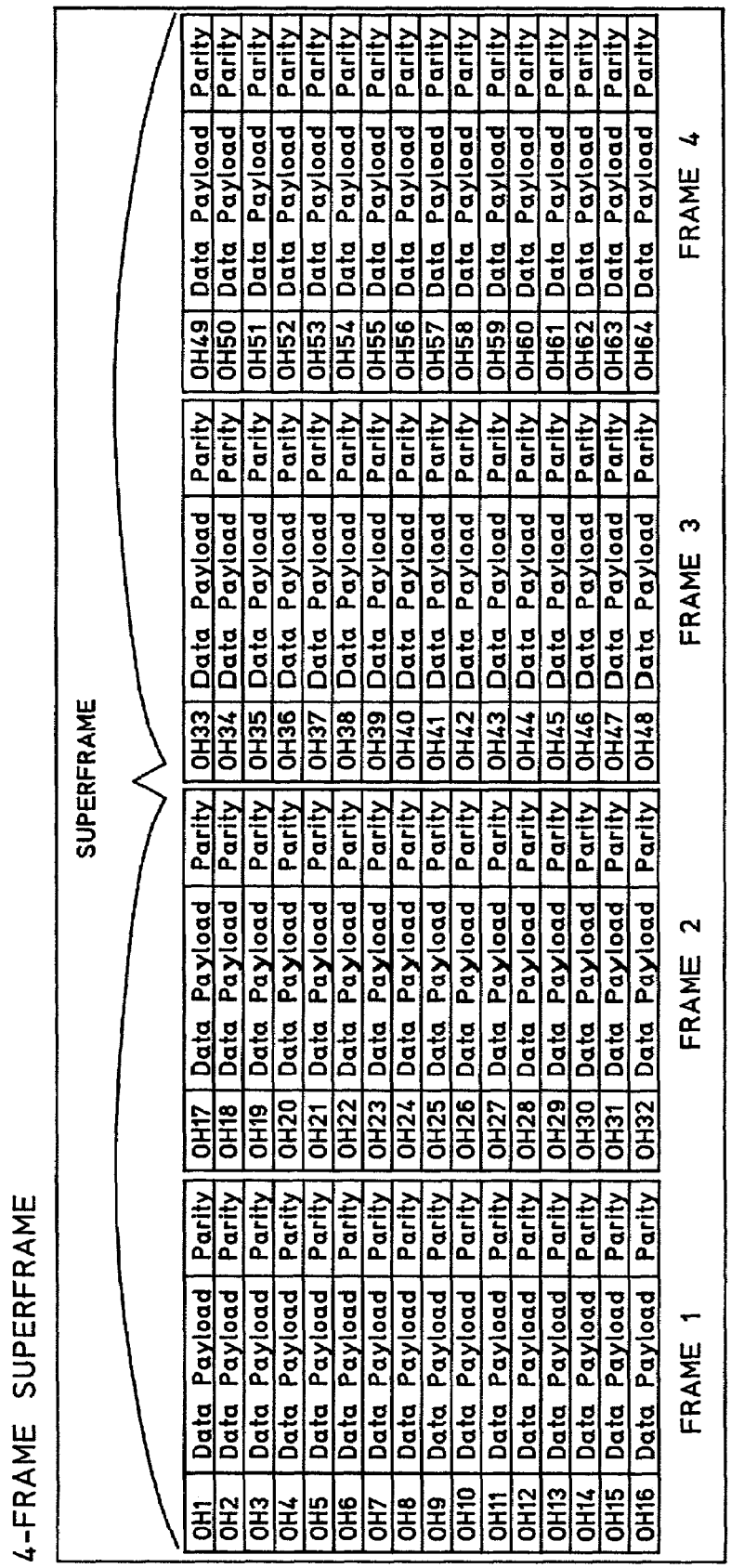
FIG. 1 is a diagram illustrating a multidimensional frame and superframe structure.

FIG. 1 is a diagram illustrating a multidimensional frame and superframe structure. Specifically, a 16-deep (row), byte-interleaved, 4-frame superframe structure is shown, but the present invention is not limited to any particular frame structure. The particular structure shown allocates bandwidth for 64 definable overhead bytes. All these bytes can be defined to implement custom functions as well as functions internally provided by the device.

By using independent receiver and transmitter modules within the device that both have frame synchronization and overhead add and drop capabilities, it is possible to bridge two networks using dissimilar protocols. This bridging function keeps the two network providers from having to rebuild their networks to be compatible with each other.

Figure 2:
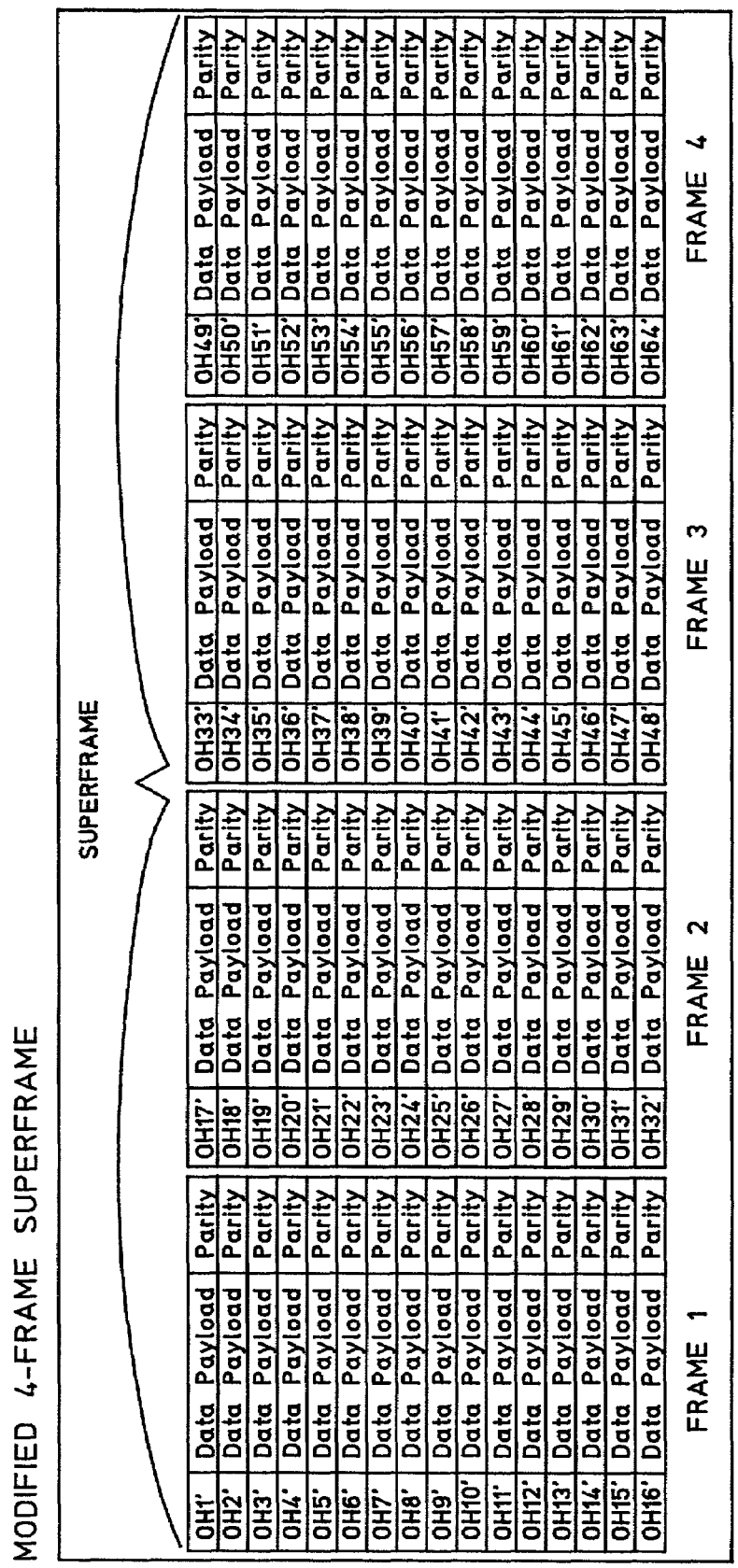
FIG. 2 is a diagram of the frame structure in FIG. 1 that has been converted to another protocol.

FIG. 2 is a diagram of the frame structure in FIG. 1 that has been converted to another protocol. As shown, the sixty-four overhead bytes have been modified. A simple example of bridging would be in modifying the number and values of the frame synchronization bytes (FSBs).

Figure 3:
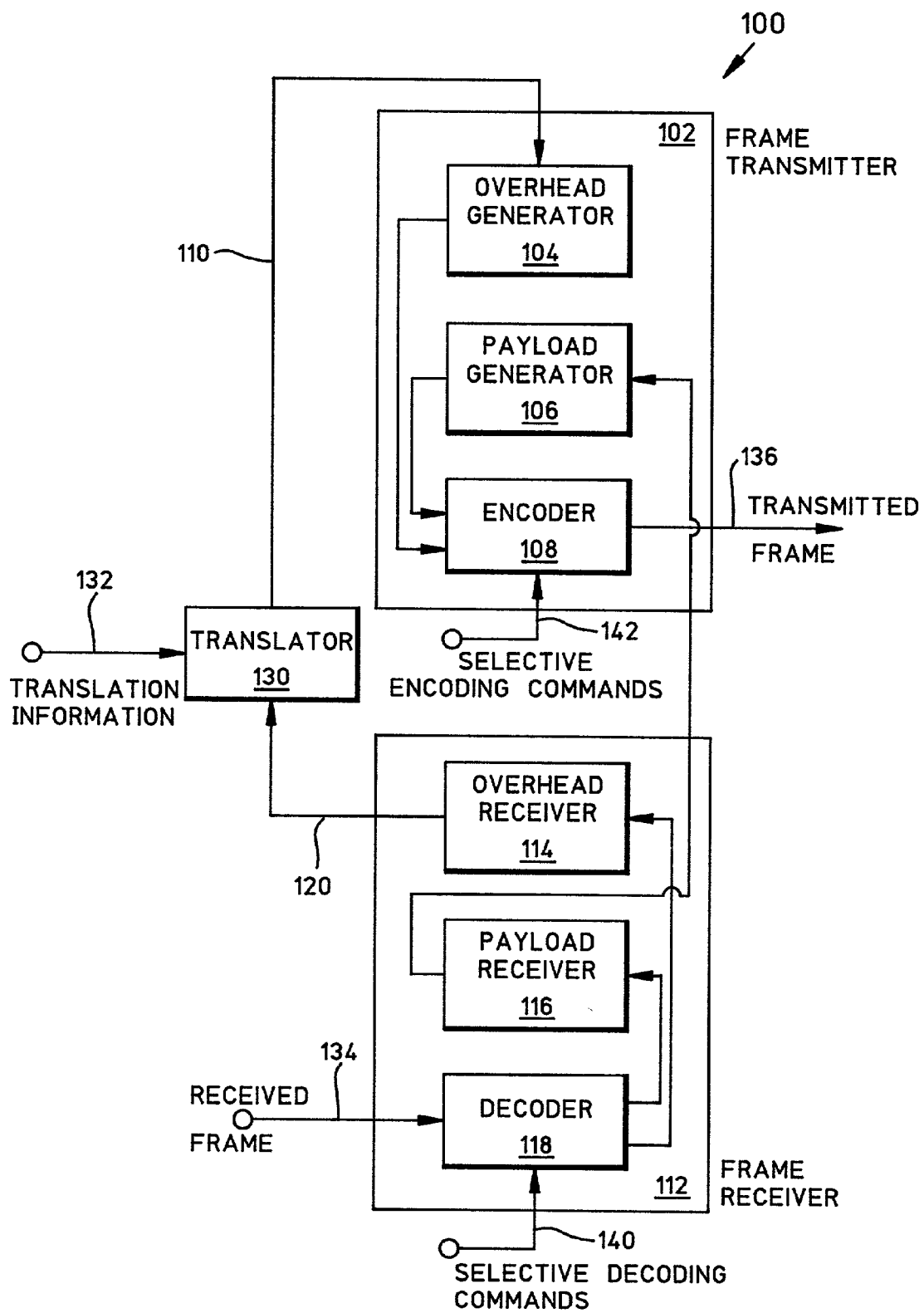
FIG. 3 is a schematic block diagram of an integrated circuit (IC) relay device for translating a multidimensional digital frame structure.

FIG. 3 is a schematic block diagram of an integrated circuit (IC) relay device for translating a multidimensional digital frame structure. The device 100 includes a frame transmitter 102 with an overhead generator 104 to generate the overhead section of a frame. The frame transmitter 102 also includes a payload generator 106 to generate the payload section of the frame and an encoder 108 to provide forward error corrected (FEC) for the frame. The overhead generator 104 has an input on line 110 to receive overhead bytes that have been translated from a first system to a second system, such as the overhead bytes converted in FIG. 2.

The device 100 further comprises a frame receiver 112 including an overhead receiver 114 to receive the overhead section of the frame, a payload receiver 116 to receive the payload section of the frame, and a decoder 118 to provide a forward error corrected (FEC) frame. The overhead receiver 114 has an output on line 120 to provide the overhead bytes organized in the first system.

Referring to FIGS. 1 and 2 momentarily, the overhead receiver 114 receives an overhead byte in a first location, OH1 for example, and the overhead generator 104 supplies the overhead bytes relocated to a second location, OH3 for example. Or the overhead receiver 114 receives an overhead byte having a first value, a value of 00 at location OH1 for example, and the overhead generator 104 replaces the overhead byte first value with a second value, FF for example.

In some aspects of the invention, the overhead receiver 114 receives a first overhead byte, and the overhead generator adds a second overhead byte to the frame overhead section. For example, an overhead byte is received in OH1 that has meaning in the first system while the OH2 overhead byte may be just a place holder. The overhead generator 104 may be required to replace the place holder value in OH2 with another value that has meaning in the second system or protocol. Likewise, the overhead receiver 114 may receive a first overhead byte that has meaning in the first system, but none in the second system. The overhead generator 104 removes the first overhead byte from the frame overhead section.

As another aspect, the overhead receiver 114 receives a first byte in a first location, and the overhead generator 104 replaces the first byte with a second byte, and locates the second byte in a second location, different than the first location. For example, the overhead generator replaces a 00 value in location OH1, which may have a meaning in the first system, with a FF value in OH2 to provide the same meaning in the second system.

The overhead bytes can provide a plurality of functions in network communications. The overhead bytes are selected from the group of functions including frame synchronization bytes, data communication channel (DCC) bytes, bit interleaved parity (BIP) bytes, Trace bytes (which are used to identify the source of a transmission), and multiframe alignment signal bytes (which are used to differentiate superframes).

The device 100 further comprises a translator 130 having an input on line 120 to accept the overhead bytes from the overhead receiver 114 and an input on line 132 to accept translation information. An output on line 110 connected to the overhead generator 104 supplies overhead bytes translated from a first system to a second system.

The translator 130 accepts translation information including the source node of the received frame on line 134 and the destination node of the transmitted frame on line 136. The translator 130 compares the first overhead byte organization associated with the source node to the second overhead byte organization associated with the destination node. The translator 130 translates overhead bytes in response to comparing the first and second overhead byte organizations. In some aspects of the invention a simple cross-referenced look-up table is consulted to accomplish the conversion. Alternately, the translator 130 performs an analysis of the function performed by the overhead bytes in the first system and calculates the overhead bytes (location, value, and quantity) required to perform an equivalent function in the second system.

In some aspects of the invention, the frames are decoded when they are received on line 134, and encoded again when they are transmitted on line 136. Alternately, the frames are decoded, but not encoded before transmission. As another alternative, the frames are received in an uncoded state, and FEC coverage is provided before transmission. In another variation, parts of the frame are selectively encoded and decoded. The selective decoding and encoding commands are provided on lines 140 and 142, respectively.

More specifically, the device can be enabled to turn the decoding function off. That is, the FEC section of a frame, sub-frame, or superframe can be selectively ignored. The decoder 118 has an input on line 140 to accept commands to selectively correct a frame. The decoder 118 receives forward error correction bytes in an active parity section of a frame and does not correct the frame in response to selective correction commands. Likewise, the frame can be received in a format including FEC, but with the bytes in the FEC section just being placeholders to maintain the multidimensional frame structure. Then, the decoder 118 receives in a non-active parity section of a frame. The encoder 108 has an input on line 142 to accept commands for selectively encoding a frame with forward error correction. The encoder 108 encodes the frame and supplies the forward error correction bytes in an active parity section of a frame.

Figure 4:
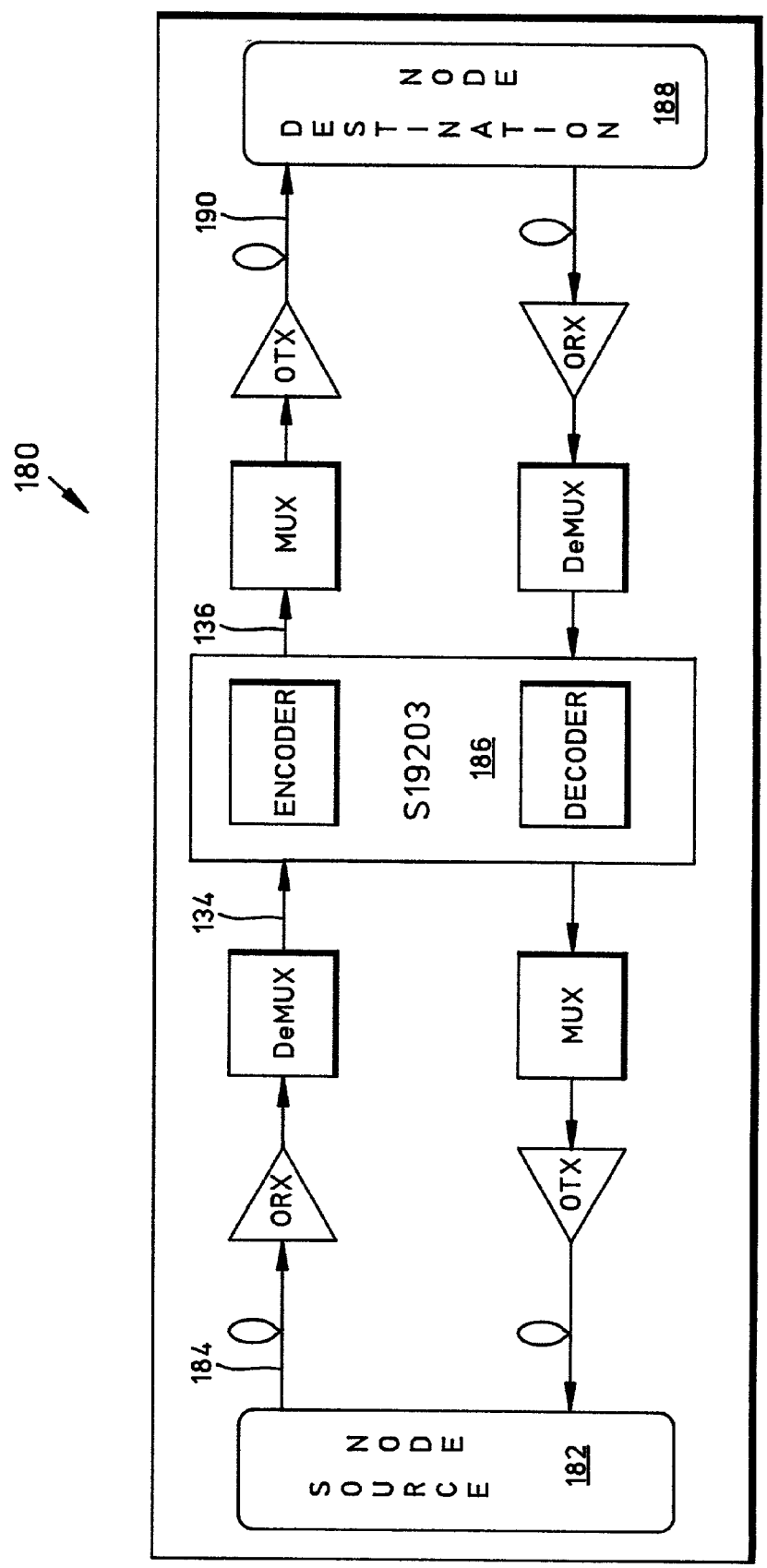
FIG. 4 is a schematic block illustrating an IC relay system for translating a multidimensional digital frame structure.

FIG. 4 is a schematic block illustrating an IC relay system for translating a multidimensional digital frame structure. The system 180 includes a source node 182 having an output on line 184 to send a frame. The device 100 of FIG. 3 is included as part of device 186. A described above, device 186 includes a frame receiver, a translator, and a frame transmitter. A destination node 188 has an input on line 190 to accept the transmitted frame. Device 186 provides for a reorganization of overhead bytes as they pass from a first system associated with the source node 182 to the second system associated with destination node 188. Actually, device 186 includes two devices that are equivalent to device 100 of FIG. 3, so that a second communication path, with a reverse translation operation, can be established with node 188 as the source and node 182 as the destination.

Tables 1 and 2 illustrate a means with providing programmable translation information to the translator. For example, the expected FSB configuration of the traffic coming into the encoder from node 202 would be defined by registers as shown in Table 1 and Table 2. The outgoing traffic towards node 208 would be defined by two similar registers that would configure the encoder output FSB locations and types.

TABLE 1

ADDR=0x248: Duplex In Frame Synchronization Byte Locations Register (Wrapper)

| | Bit | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Name | DupIn OH FSB Loc 1 | DupIn OH FSB Loc 2 | DupIn OH FSB Loc 3 | DupIn OH FSB Loc 4 | DupIn OH FSB Loc 5 | DupIn OH FSB Loc 6 | DupIn OH FSB Loc 7 | DupIn OH FSB Loc 8 | Unused | | | | | | | |
| Mode | rw | rw | rw | rw | rw | rw | rw | rw | ro | ro | ro | ro | ro | ro | ro | ro |
| Default | 1 | 1 | 1 | 1 | 1 | 1 | 0 | 0 | 0 | 0 | 0 | 0 | 0 | 0 | 0 | 0 |

| Bit Positions | Function | Description |
|---|---|---|
| 15 | DupIn OH FSB Loc 1 | 0: Not a Frame Synchronization Byte<br>1: Frame Synchronization Byte (FSB) (Default) |
| 14 | DupIn OH FSB Loc 2 | 0: Not a Frame Synchronization Byte<br>1: Frame Synchronization Byte (FSB) (Default) |
| 13 | DupIn OH FSB Loc 3 | 0: Not a Frame Synchronization Byte<br>1: Frame Synchronization Byte (FSB) (Default) |
| 12 | DupIn OH FSB Loc 4 | 0: Not a Frame Synchronization Byte<br>1: Frame Synchronization Byte (FSB) (Default) |
| 11 | DupIn OH FSB Loc 5 | 0: Not a Frame Synchronization Byte<br>1: Frame Synchronization Byte (FSB) (Default) |
| 10 | DupIn OH FSB Loc 6 | 0: Not a Frame Synchronization Byte<br>1: Frame Synchronization Byte (FSB) (Default) |
| 9 | DupIn OH FSB Loc 7 | 0: Not a Frame Synchronization Byte (Default)<br>1: Frame Synchronization Byte (FSB) |
| 8 | DupIn OH FSB Loc 8 | 0: Not a Frame Synchronization Byte (Default)<br>1: Frame Synchronization Byte (FSB) |
| 7:0 | Unused | |

TABLE 2

ADDR=0x24A: Duplex In Frame Synchronization Byte Types (Wrapper)

| | Bit | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Name | Dup In OH FSB Type 1 | Dup In OH FSB Type 2 | Dup In OH FSB Type 3 | Dup In OH FSB Type 4 | Dup In OH FSB Type 5 | Dup In OH FSB Type 6 | Dup In OH FSB Type 7 | Dup In OH FSB Type 8 | Unused | | | | | | | |
| Mode | rw | rw | rw | rw | rw | rw | rw | rw | ro | ro | ro | ro | ro | ro | ro | ro |
| Default | 0 | 0 | 0 | 1 | 1 | 1 | 0 | 0 | 0 | 0 | 0 | 0 | 0 | 0 | 0 | 0 |

NOTE: This register is specific to the Digital Wrapper configuration. If an OH byte is not defined to be an FSB in the Duplex In Frame Synchronization Byte Locations Register, the corresponding bit in this register has no significance.

| Bit Positions | Function | Description |
|---|---|---|
| 15 | Dup In OH FSB Type 1 | 0: Dup In OA1 (Default)<br>1: Dup In OA2 |
| 14 | Dup In OH FSB Type 2 | 0: Dup In OA1 (Default)<br>1: Dup In OA2 |
| 13 | Dup In OH FSB Type 3 | 0: Dup In OA1 (Default)<br>1: Dup In OA2 |
| 12 | Dup In OH FSB Type 4 | 0: Dup In OA1 (Default)<br>1: Dup In OA2 |
| 11 | Dup In OH FSB Type 5 | 0: Dup In OA1 (Default)<br>1: Dup In OA2 |
| 10 | Dup In OH FSB Type 6 | 0: Dup In OA1 (Default)<br>1: Dup In OA2 |

TABLE 2-continued

| ADDR=0x24A: Duplex In Frame Synchronization Byte Types (Wrapper) | | |
|---|---|---|
| 9 | Dup In OH FSB Type 7 | 0: Dup In OA1 (Default) |
| | | 1: Dup In OA2 |
| 8 | Dup In OH FSB Type 8 | 0: Dup In OA1 (Default) |
| | | 1: Dup In OA2 |
| 7:0 | Unused | |

Using FPGA interfaces and the internal configuration registers, overhead bytes and functions can be relocated to meet almost any bridging requirement.

Figure 5:
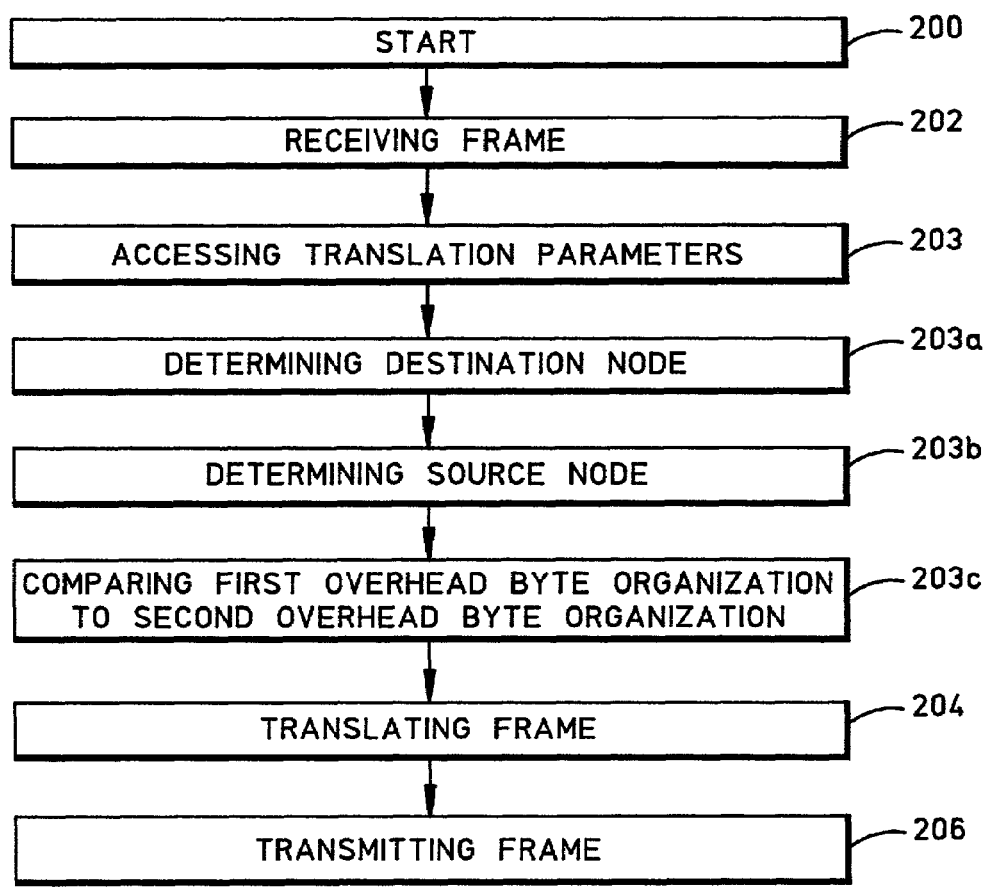
FIG. 5 is a flowchart depicting a method for translating multidimensional digital frame structures.

FIG. 5 is a flowchart depicting a method for translating multidimensional digital frame structures. Although the method is depicted as a series of numbered steps for clarity, no order should be inferred unless explicitly stated. The method begins with Step 200. Step 202 receives a frame with overhead bytes organized in a first system. Step 204 translates the frame so that the overhead bytes are organized in a second system.

In some aspects of the invention, receiving a frame with overhead bytes organized in a first system in Step 202 includes receiving an overhead byte in a first location. Translating the frame so that the overhead bytes are organized in a second system in Step 204 includes relocating the overhead byte to a second location.

In some aspects of the invention, receiving a frame with overhead bytes organized in a first system in Step 202 includes receiving an overhead byte having a first value. Translating the frame so that the overhead bytes are organized in a second system in Step 204 includes replacing the overhead byte with a second value.

In some aspects, receiving a frame with overhead bytes organized in a first system in Step 202 includes receiving a first overhead byte. Translating the frame so that the overhead bytes are organized in a second system in Step 204 includes adding a second overhead byte.

In some aspects of the invention, receiving a frame with overhead bytes organized in a first system in Step 202 includes receiving a first overhead byte. Translating the frame so that the overhead bytes are organized in a second system in Step 204 includes removing the first overhead byte.

In some aspects, receiving a frame with overhead bytes organized in a first system in Step 202 includes receiving a first byte in a first location. Translating the frame so that the overhead bytes are organized in a second system in Step 204 includes replacing the first byte with a second byte, and locating the second byte in a second location, different than the first location.

In some aspects of the invention, the overhead bytes are selected from the group overhead byte function including frame synchronization bytes, data communication channel (DCC) bytes, bit interleaved parity (BIP) bytes, Trace bytes, and multiframe alignment signal bytes.

In some aspects, Step 203 accesses translation parameters preceding the translating of the frame. Translating the frame so that the overhead bytes are organized in a second system in Step 204 includes translating in response to the accessed translation parameters.

Step 203a determines a destination node preceding the accessing of translation parameters. Step 203b determines the source node from which the frame is received. Step 203c compares the first overhead byte organization associated with the source node to the second overhead byte organization associated with the destination node. Accessing translation parameters in Step 203 includes translating creating translation parameters in response to comparing the first and second overhead byte organizations.

Step 206 transmits the frame with overhead bytes organized in the second system to the destination node.

In some aspects of the invention, receiving a frame with overhead bytes organized in a first system in Step 202 includes receiving a first frame synchronization byte in a first location, and a second frame synchronization byte in a second location. Translating the frame so that the overhead bytes are organized in a second system in Step 204 includes locating the first byte in a third location, and the second byte in a fourth location in the frame.

In some aspects, translating the frame so that the overhead bytes are organized in a second system in Step 204 includes the first and third locations being different.

In some aspects, translating the frame so that the overhead bytes are organized in a second system in Step 204 includes the second and fourth locations being different.

In some aspects of the invention, receiving a frame with overhead bytes organized in a first system in Step 202 includes receiving a first frame synchronization byte value. Translating the frame so that the overhead bytes are organized in a second system in Step 204 includes replacing the first frame synchronization byte value with a second frame synchronization byte value.

In some aspects, receiving a frame with overhead bytes organized in a first system in Step 202 includes receiving a first frame synchronization byte. Translating the frame so that the overhead bytes are organized in a second system in Step 204 includes dropping the first frame synchronization byte.

In some aspects of the invention, receiving a frame with overhead bytes organized in a first system in Step 202 includes receiving a first frame synchronization byte. Translating the frame so that the overhead bytes are organized in a second system in Step 204 includes adding a second frame synchronization byte.

In some aspects of the invention, receiving a frame with overhead bytes organized in a first system in Step 202 includes receiving a frame with a forward error correction bytes in an active parity section. Translating the frame so that the overhead bytes are organized in a second system in Step 204 includes ignoring the forward error correction bytes so that parity section is not active. Alternately, receiving a frame with overhead bytes organized in a first system in Step 202 includes receiving a frame with bytes in a non-active parity section. Translating the frame so that the overhead bytes are organized in a second system in Step 204 includes calculating the forward error correction bytes for the frame and making the parity section active.

A system and method for translating between digital wrapper framing protocols has been described. The advantage of this invention over prior art is that it provides a fully customizable bridging function for connecting two dissimilar networks using a 16-deep, byte-interleaved, 4-frame superframe structure as a standard feature. The invention does this by keeping encoder and decoder functions separate and by putting the locations and functions of all overhead bytes under programmable control. Other variations and embodiments will occur to those skilled in the art.

We claim:

1. A method for translating multidimensional digital frame structures, the method comprising:
    receiving a frame with overhead bytes organized in a first system;
    wherein receiving the frame with overhead bytes organized in the first system includes receiving a first frame synchronization byte in a first location, and a second frame synchronization byte in a second location;
    determining a destination node;
    determining a source node from which the frame is received;
    comparing a first overhead byte organization associated with the source node to a second overhead byte organization associated with the destination node;
    accessing translation parameters by creating translation parameters in response to comparing the first and second overhead byte organizations;
    translating the frame in response to the accessed translation parameters so that the overhead bytes are organized in a second system;
    wherein translating the frame so that the overhead bytes are organized in a second system includes locating the first frame synchronization byte in a third location, and the second frame synchronization byte in a fourth location in the frame; and
    transmitting the frame with the overhead bytes organized in the second system to the destination node.

2. The method of claim 1 wherein receiving the frame with overhead bytes organized in the first system includes receiving an overhead byte in a first location; and
    wherein translating the frame so that the overhead bytes are organized in the second system includes relocating the overhead byte to a second location.

3. The method of claim 1 wherein receiving the frame with overhead bytes organized in the first system includes receiving an overhead byte having a first value; and
    wherein translating the frame so that the overhead bytes are organized in the second system includes replacing the overhead byte with a second value.

4. The method of claim 1 wherein receiving the frame with overhead bytes organized in the first system includes receiving a first overhead byte; and
    wherein translating the frame so that the overhead bytes are organized in the second system includes adding a second overhead byte.

5. The method of claim 1 wherein receiving the frame with overhead bytes organized in the first system includes receiving a first overhead byte; and
    wherein translating the frame so that the overhead bytes are organized in the second system includes removing the first overhead byte.

6. The method of claim 1 wherein receiving the frame with overhead bytes organized in the first system includes receiving a first byte in a first location; and
    wherein translating the frame so that the overhead bytes are organized in the second system includes replacing the first byte with a second byte, and locating the second byte in a second location, different than the first location.

7. The method of claim 1 wherein the overhead bytes are selected from the group of overhead byte functions including frame synchronization bytes, data communication channel (DCC) bytes, bit interleaved parity (BIP) bytes, Trace bytes, and multiframe alignment signal bytes.

8. The method of claim 1 wherein translating the frame so that the overhead bytes are organized in the second system includes the first and third locations being different.

9. The method of claim 8 wherein translating the frame so that the overhead bytes are organized in the second system includes the second and fourth locations being different.

10. The method of claim 1 wherein receiving the frame with overhead bytes organized in the first system includes receiving a first frame synchronization byte value; and
    wherein translating the frame so that the overhead bytes are organized in the second system includes replacing the first frame synchronization byte value with a second frame synchronization byte value.

11. The method of claim 1 wherein receiving the frame with overhead bytes organized in the first system includes receiving a first frame synchronization byte; and
    wherein translating the frame so that the overhead bytes are organized in the second system includes dropping the first frame synchronization byte.

12. The method of claim 1 wherein receiving a frame with overhead bytes organized in the first system includes receiving the first frame synchronization byte; and
    wherein translating the frame so that the overhead bytes are organized in the second system includes adding a second frame synchronization byte.

13. The method of claim 1 wherein receiving the frame with overhead bytes organized in the first system includes receiving a frame with a forward error correction bytes in an active parity section; and
    wherein translating the frame so that the overhead bytes are organized in the second system includes ignoring the forward error correction bytes so that parity section is not active.

14. The method of claim 1 wherein receiving the frame with overhead bytes organized in the first system includes receiving a frame with bytes in a non-active parity section; and
    wherein translating the frame so that the overhead bytes are organized in the second system includes calculating the forward error correction bytes for the frame and making the parity section active.

15. An integrated circuit (IC) relay device for translating a multidimensional digital frame structure, the device comprising:
    a frame transmitter including an overhead generator to generate an overhead section of a transmitted frame, a payload generator to generate a payload section of the frame, and an encoder to provide forward error correction (FEC) for the frame;
    wherein the overhead generator includes an input to receive overhead bytes that have been translated from a first system to a second system;
    a frame receiver including an overhead receiver to receive an overhead section of a received frame, a payload receiver to receive a payload section of the frame, and a decoder to provide a forward error corrected (FEC) frame;
    wherein the overhead receiver includes an output to provide the overhead bytes organized in the first system;
    a translator having an input to accept the overhead bytes from the overhead receiver, an input to accept translation information, and an output connected to the overhead generator to supply the overhead bytes translated from the first system to the second system; and wherein the translator accepts translation information associated with a source node of the received frame and a destination node of the transmitted frame, wherein the translator compares a first overhead byte organization associated with the source node to a second overhead byte organization associated with the destination node, and wherein the translator translates the overhead bytes in response to comparing the first and second overhead byte organizations.

16. The device of claim 15 wherein the overhead receiver receives an overhead byte in a first location; and wherein the overhead generator supplies the overhead byte relocated to a second location.

17. The device of claim 15 wherein the overhead receiver receives an overhead byte having a first value; and wherein the overhead generator replaces the overhead byte first value with a second value.

18. The device of claim 15 wherein the overhead receiver receives a first overhead byte; and wherein the overhead generator adds a second overhead byte to the frame overhead section.

19. The device of claim 15 wherein the overhead receiver receives a first overhead byte; and wherein the overhead generator removes the first overhead byte from the frame overhead section.

20. The device of claim 15 wherein the overhead receiver receives a first byte in a first location; and wherein the overhead generator replaces the first byte with a second byte, and locates the second byte in a second location, different than the first location.

21. The device of claim 15 in which the overhead bytes are selected from the group including frame synchronization bytes, data communication channel (DCC) bytes, bit interleaved parity (BIP) bytes, Trace bytes, and multiframe alignment signal bytes.

22. The device of claim 15 wherein the decoder has an input to accept commands to selectively correct a frame, and wherein the decoder receives forward error correction bytes in an active parity section of a frame and does not correct the frame in response to selective correction commands.

23. The device of claim 22 wherein the decoder receives in a non-active parity section of a frame; and wherein the encoder has an input to accept commands for selectively encoding a frame with forward error correction, and wherein the encoder encodes the frame and supplies the forward error correction bytes in an active parity section of a frame.

* * * * *